United States Patent
Ohmori et al.

(10) Patent No.: US 12,541,076 B2
(45) Date of Patent: Feb. 3, 2026

(54) LENS APPARATUS AND IMAGE PICKUP APPARATUS

(71) Applicant: CANON KABUSHIKI KAISHA, Tokyo (JP)

(72) Inventors: Katsumi Ohmori, Tochigi (JP); Masayasu Mizushima, Tochigi (JP); Yuichiro Kato, Tochigi (JP); Toshimune Nagano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 18/330,701

(22) Filed: Jun. 7, 2023

(65) Prior Publication Data

US 2024/0019661 A1 Jan. 18, 2024

(30) Foreign Application Priority Data

Jul. 13, 2022 (JP) .................................. 2022-112498

(51) Int. Cl.
*G02B 7/04* (2021.01)
*H04N 5/265* (2006.01)
(Continued)

(52) U.S. Cl.
CPC ............... *G02B 7/04* (2013.01); *H04N 5/265* (2013.01); *H04N 23/55* (2023.01); *H04N 23/65* (2023.01);
(Continued)

(58) Field of Classification Search
CPC .. H04N 23/6812; H04N 23/673; H04N 23/66; H04N 23/687; H04N 23/667;
(Continued)

(56) References Cited

U.S. PATENT DOCUMENTS

2009/0309982 A1* 12/2009 Rouvinen .......... H04N 23/6812
348/E5.046
2012/0236424 A1* 9/2012 Yang .................... G03B 17/565
359/819
(Continued)

FOREIGN PATENT DOCUMENTS

JP   H0580399 A    4/1993
JP   2015197660 A  11/2015
(Continued)

*Primary Examiner* — Xi Wang
(74) *Attorney, Agent, or Firm* — ROSSI, KIMMS & McDOWELL LLP (57) ABSTRACT

A lens apparatus includes a shift lens movable in a direction orthogonal to an optical axis of an imaging optical system, an actuator configured to drive the shift lens in a plane orthogonal to the optical axis, a memory storing instructions, and a processor configured to execute the instructions to control the actuator. The actuator includes a first actuator configured to drive the shift lens in a first direction within the plane, and a second actuator configured to drive the shift lens in a second direction within the plane. In driving the shift lens in a third direction different from the first direction and the second direction, the processor controls the actuator so that the first actuator and the second actuator are not simultaneously driven.

17 Claims, 4 Drawing Sheets

(51) Int. Cl.
  *H04N 23/55* (2023.01)
  *H04N 23/65* (2023.01)
  *H04N 23/667* (2023.01)
  *H04N 23/68* (2023.01)
(52) U.S. Cl.
  CPC ......... *H04N 23/667* (2023.01); *H04N 23/687* (2023.01)
(58) Field of Classification Search
  CPC ........ H04N 23/65; H04N 23/55; H04N 5/265; H04N 5/23287; H04N 5/2254; H04N 5/2257; G02B 7/04; G02B 7/09; G03B 2205/0007; G03B 5/00
  See application file for complete search history.

(56) References Cited

U.S. PATENT DOCUMENTS

| | | | |
|---|---|---|---|
| 2016/0028930 A1* | 1/2016 | Kim | H04N 23/682 348/208.99 |
| 2017/0108705 A1* | 4/2017 | Yu | G02B 7/09 |
| 2018/0176470 A1* | 6/2018 | Kim | G03B 5/02 |

FOREIGN PATENT DOCUMENTS

| | | | |
|---|---|---|---|
| JP | 2019090952 A | 6/2019 | |
| JP | 2019091027 A | 6/2019 | |
| JP | 2021117415 A | 8/2021 | |
| JP | 2021118488 A | 8/2021 | |

\* cited by examiner

IMAGE 1

FIG. 4A

IMAGE 2                                                                 IMAGE 3

IMAGE 5                                                                 IMAGE 4

FIG. 4B

LENS APPARATUS AND IMAGE PICKUP APPARATUS

BACKGROUND

Technical Field

One of the aspects of the embodiments relates to a lens apparatus and an image pickup apparatus.

Description of Related Art

Japanese Patent Laid-Open No. 2019-090952 discloses a lens apparatus that can obtain a tilt effect and a shift effect that shifts a composition by moving two optical element units of an imaging optical system in a direction orthogonal to the optical axis. Japanese Patent Laid-Open No. 2019-091027 discloses a lens apparatus that determines a tilt amount for each specific area set in an imaging range and focuses on an object using a desired focal plane.

The lens apparatuses disclosed in Japanese Patent Laid-Open Nos. 2019-090952 and 2019-091027 move two lenses (shift lenses) that are movable in the direction orthogonal to the optical axis, in arbitrary directions on a plane orthogonal to the optical axis, and includes a plurality of actuators (a plurality of driving units). Simultaneous driving of the plurality of driving units requires a large amount of electric power. In addition, depending on the power suppliable to the plurality of driving units, it may be difficult to drive each driving unit.

SUMMARY

A lens apparatus according to one aspect of the disclosure includes a shift lens movable in a direction orthogonal to an optical axis of an imaging optical system, an actuator configured to drive the shift lens in a plane orthogonal to the optical axis, a memory storing instructions, and a processor configured to execute the instructions to control the actuator. The actuator includes a first actuator configured to drive the shift lens in a first direction within the plane, and a second actuator configured to drive the shift lens in a second direction within the plane. In driving the shift lens in a third direction different from the first direction and the second direction, the processor controls the actuator so that the first actuator and the second actuator are not simultaneously driven.

A lens apparatus according to another aspect of the disclosure includes a shift lens including a first shift lens and a second shift lens that generate a tilt effect and a shift effect by moving in a direction orthogonal to an optical axis of an imaging optical system, an actuator configured to drive the first shift lens or the second shift lens in a plane orthogonal to the optical axis, a memory storing instructions, and a processor configured to execute the instructions to control the actuator. The actuator includes a first actuator configured to drive the first shift lens or the second shift lens in a first direction within the plane, and a second actuator configured to drive the first shift lens or the second shift lens in a second direction within the plane. In driving the first shift lens or the second shift lens in a third direction different from the first direction and the second direction, the processor controls the actuator by providing a period in which the first actuator and the second actuator are not simultaneously driven.

An image pickup apparatus having each of the above lens apparatus also constitutes another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
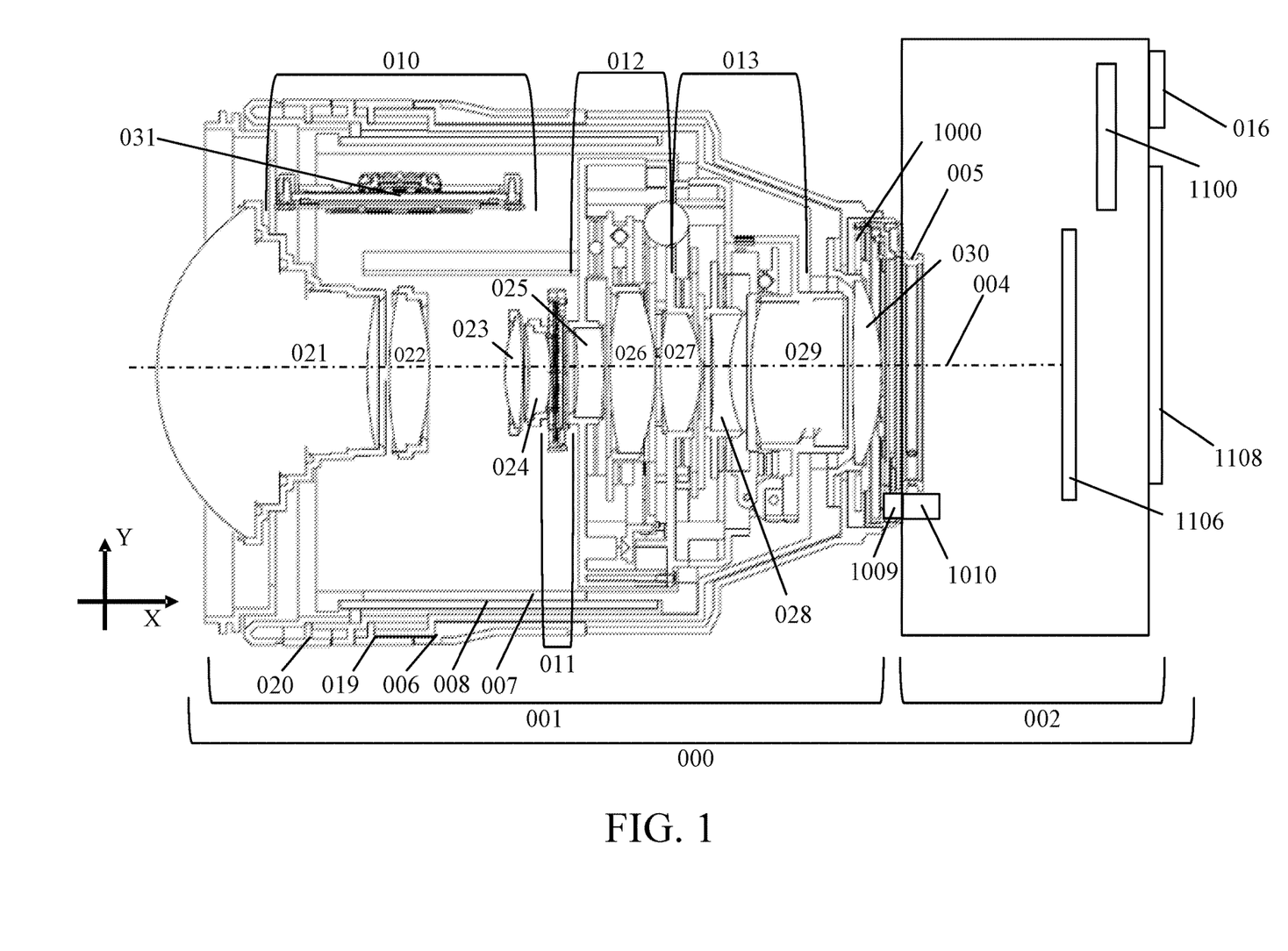
FIG. 1 is a sectional view of a camera system according to a first embodiment.
Figure 2:
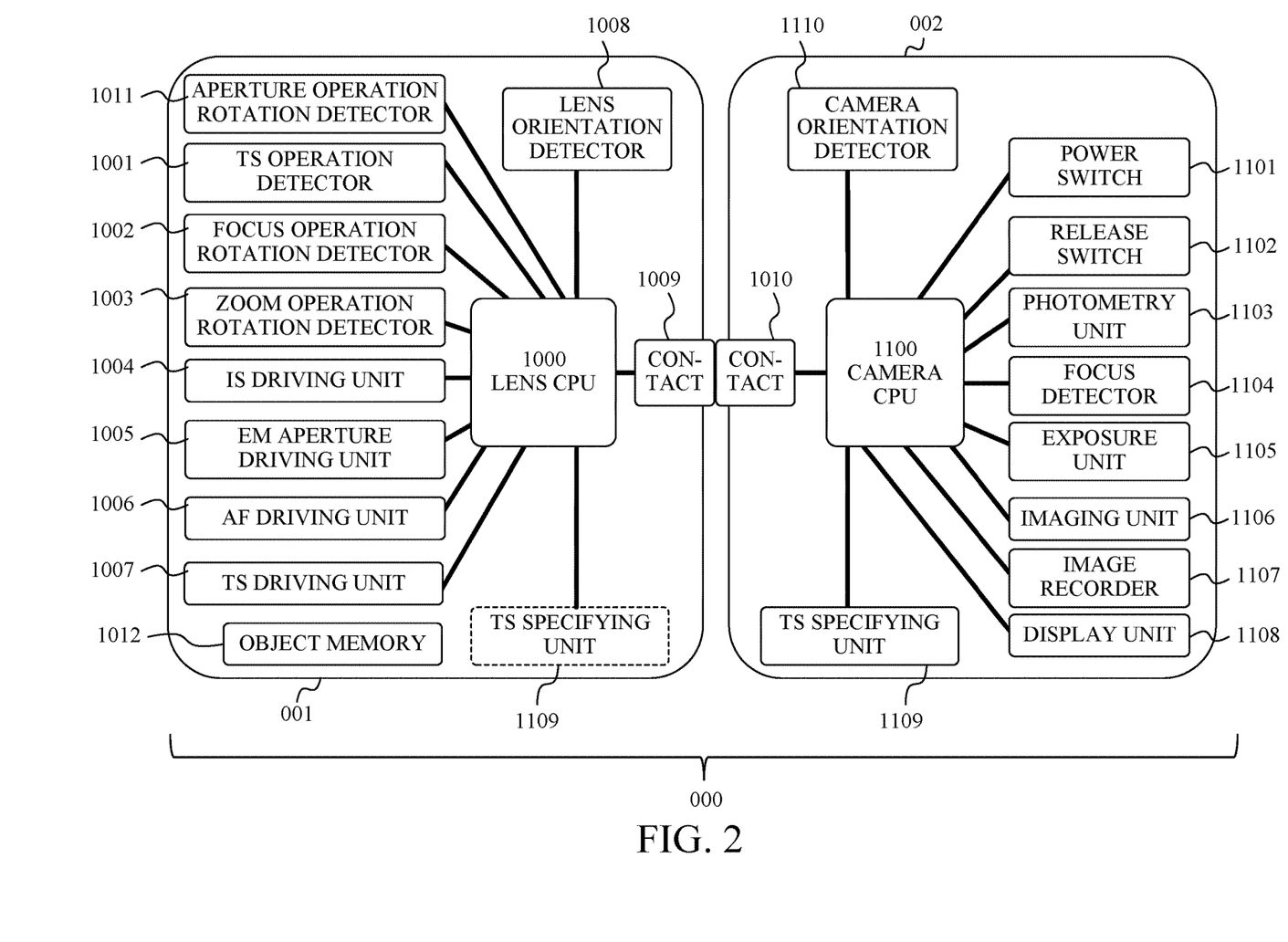
FIG. 2 is a block diagram of the camera system according to the first embodiment.

Referring now to FIGS. 1 and 2, a description will be given of a camera system (imaging system) 000 according to a first embodiment of the disclosure. FIG. 1 is a sectional view of a camera system 000. In FIG. 1, an X-axis direction is set to a direction (optical axis direction) along an optical axis 004 of an imaging optical system, a Y-axis direction is set to a pitch direction, and a Z-axis direction is set to a yaw direction. FIG. 2 is a block diagram of the camera system 000. The camera system 000 includes a camera body (image pickup apparatus body) 002 and a lens apparatus (interchangeable lens) 001 attachable to and detachable from the camera body 002. This embodiment is not limited to this example, and is applicable to an image pickup apparatus in which a camera body and a lens apparatus are integrated.

The camera body 002 includes an imaging unit 1106 including a photoelectric conversion element (image sensor) such as a CMOS sensor or CCD sensor. Controlling an unillustrated shutter using a camera CPU 1100 (processor, control unit) can expose and capture an image formed through the lens apparatus 001 onto the imaging unit 1106 for an arbitrary time. The camera body 002 further includes a display unit 1108 having a touch panel function that can display the captured image and change various settings of the camera system 000, and a viewfinder 016 that enables a user to confirm the captured image and to input a visual line when the user looks into the camera.

The lens apparatus 001 includes an imaging optical system. The imaging optical system includes a first lens 021, a second lens 022, a third lens 023, a fourth lens 024, a fifth lens 025, a sixth lens 026, a seventh lens 027, an eighth lens 028, a ninth lens 029, and a tenth lens 030. By changing a positional relationship among these lenses in the optical axis direction in the imaging optical system, the focal length of the lens apparatus 001 changes. Each lens is not limited to a single lens, and may be a lens unit having a plurality of lenses. The lens apparatus 001 further includes a lens CPU (processor, control unit) 1000. The lens CPU 1000 controls, for example, the driving for moving the sixth lens 026 and the eighth lens 028 in a direction orthogonal to the optical axis 004, the driving for changing an aperture diameter of an aperture (stop) mechanism 011, and the like.

Each lens is held by a lens barrel having a cam follower, and the focal length of the lens apparatus 001 is changed by changing the positional relationship among the lenses in the optical axis direction. The cam follower is engaged with a linear groove parallel to the optical axis 004 of a guide cylinder 007 and a groove tilted relative to the optical axis 004 of the cam cylinder 008. At this time, as a zoom operation ring 006 is rotated, the cam cylinder 008 having a groove tilted relative to the optical axis 004 is rotated. That is, the focal length can be changed by rotating the zoom operation ring 006. The focal length of the imaging optical system is detectable by an unillustrated zoom position detector that detects a rotation amount of the zoom operation ring 006.

The second lens 022 is a focus unit for providing focusing by moving in the optical axis direction. The second lens 022 constitutes a focus unit 010 with an unillustrated guide bar for guiding the focus unit in the optical axis direction, a vibration actuator 031, and a position detector (not illustrated) configured to detect a moving distance. The lens CPU 1000 controls the driving of the focus unit 010.

The sixth lens (first shift lens) 026 and the eighth lens (second shift lens) 028 are shift lenses movable in the direction orthogonal to the optical axis 004. The sixth lens 026 and the eighth lens 028 are moved in the direction orthogonal to the optical axis 004 to produce a tilt effect of tilting the focal plane relative to the imaging plane (light receiving plane of the image sensor) or a shift effect of shifting the imaging range. More specifically, in a case where the sixth lens 026 and the eighth lens 028 both have positive refractive power or both have negative refractive power, the tilt effect can be generated by moving them in opposite directions. The shift effect can be generated by moving the sixth lens and the eighth lens in the same direction. In a case where one of the sixth lens 026 and the eighth lens 028 has positive refractive power and the other has negative refractive power, moving them in opposite directions can produce the shift effect and moving the sixth lens and the eighth lens in the same direction can produce the tilt effect.

A first shift unit 012 includes the sixth lens 026, a holder configured to hold the lens movably in the direction orthogonal to the optical axis 004, an actuator (driving unit), and a shift position detector configured to detect a moving distance. Similarly, the second shift unit 013 includes the eighth lens 028, a holder for holding the lens movably in the direction orthogonal to the optical axis 004, an actuator (driving unit), and a shift position detector configured to detect a moving distance. The lens CPU 1000 controls the driving of the first shift unit 012 and the driving of the second shift unit 013.

The lens apparatus 001 includes a mount 005 and is connected and fixed to a mount (not illustrated) of the camera body 002. The lens apparatus 001 and camera body 002 also have a lens electrical contact 1009 and a camera electrical contact 1010, respectively, for electrical connection. This electrical connection allows the contents set in the camera body 002 to be reflected in the lens apparatus 001.

A description will now be given of the control by the camera body 002. The camera CPU 1100 includes a microcomputer and controls the operation of each component in the camera body 002. In a case where the lens apparatus 001 is attached to the camera body 002, the camera CPU 1100 can communicate with the lens CPU 1000 provided in the lens apparatus 001 via the lens electrical contact 1009 and the camera electrical contact 1010.

The information (signal) that the camera CPU 1100 transmits to the lens CPU 1000 includes driving amount information and focus shift information of the second lens 022. This information further includes orientation information of the camera body 002 based on a signal from a camera orientation detector 1110 such as an unillustrated acceleration sensor (acceleration detector). This information includes object distance information of an object based on a signal from a tilt/shift (TS) specifying unit 1109 for specifying a desired object that the user wishes to focus on, focus shift information, and imaging range information for specifying a desired imaging range (field of view), etc. Details of the TS specifying unit 1109 will be described below. The information (signal) that the lens CPU 1000 transmits to the camera CPU 1100 includes optical information such as the imaging magnification of the lens apparatus 001 and lens function information such as zooming and image stabilization mounted on the attached lens apparatus 001. This information further includes orientation information from a lens orientation detector 1008 such as a gyro sensor or an acceleration sensor. Each of the lens electrical contact 1009 and the camera electrical contact 1010 includes a contact for supplying power from the camera body 002 to the lens apparatus 001.

A power switch 1101 is a switch operable by the user, and configured to start the camera CPU 1100 and supply power to each actuator, sensor, etc. in the camera system 000. A release switch 1102 is a switch operable by the user, and includes a first stroke switch SW1 and a second stroke switch SW2. A signal from the release switch 1102 is input to the camera CPU 1100. The camera CPU 1100 enters an imaging preparation state in response to the input of the turning-on signal from the first stroke switch SW1. In the imaging preparation state, a photometry unit 1103 measures object luminance and a focus detector 1104 performs focus detection.

The camera CPU 1100 calculates the F-number of the aperture mechanism 011 and the exposure amount (shutter speed) of the image sensor of the imaging unit 1106 based on the photometry result of the photometry unit 1103. The camera CPU 1100 also detects the focus state of the imaging optical system by the focus detector 1104. The camera CPU 1100 determines information about a driving amount (including a driving direction) of the second lens 022 using the focus unit 010 as a driving source to obtain an in-focus state on the object based on the focus information (defocus amount and defocus direction) as the detection result. Information about the driving amount of the second lens 022 is transmitted to the lens CPU 1000. A lens CPU 1000 controls the operation of each component in the lens apparatus 001.

The lens apparatus 001 is configured to move the sixth lens 026 and the eighth lens 028 in the direction orthogonal to the optical axis 004 to produce the tilt effect of tilting the focal plane relative to the imaging plane and the shift effect of moving the imaging range. Therefore, the camera CPU 1100 calculates a tilt driving amount for focusing on a desired object specified by the TS specifying unit 1109. The camera CPU 1100 calculates a shift driving amount for changing the current imaging range to an imaging range specified by the TS specifying unit 1109. Information about these driving amounts is transmitted from the camera CPU 1100 to the lens CPU 1000 to control the driving of the sixth lens 026 and the driving of the eighth lens 028.

A plurality of objects may be specified by the TS specifying unit 1109. Even if the objects are located at different distances, they can be brought into focus as long as they are on an object plane tilted by the tilt effect described above. The TS specifying unit 1109 may be provided in the lens apparatus 001 instead of the camera body 002. The function of the TS specifying unit 1109 can be assigned to the existing rotational operation units, buttons, switches, etc. of the lens apparatus 001 and the camera body 002.

In a case where the camera CPU 1100 enters a predetermined imaging mode, it starts eccentrically driving an unillustrated image stabilizing lens, that is, controls image stabilizing operation. In a case where the lens apparatus 001 has no image stabilizing lens (image stabilizing function), eccentric driving control of the image stabilizing lens is unnecessary. In a case where a turning-on signal is input from the second stroke switch SW2, the camera CPU 1100 transmits an aperture driving command to the lens CPU 1000, and sets the aperture mechanism 011 to the previously calculated F-number (aperture value). The camera CPU 1100 also transmits an exposure starting command to an exposure unit 1105. Thereafter, the camera CPU 1100 performs a retraction operation of an unillustrated mirror (although a mirrorless camera does not have this operation) and an opening operation of an unillustrated shutter, that is, the exposure operation.

An imaging signal from the imaging unit 1106 is digitally converted by a signal processor in the camera CPU 1100, receives various correction processing, and is output as an image signal. The image signal (data) is recorded and stored in a recording medium such as a semiconductor memory such as a flash memory, a magnetic disk, or an optical disc in an image recorder 1107. An image captured by the imaging unit 1106 can be displayed on the display unit 1108, which is a display using liquid crystal or organic EL technology during imaging. Images recorded in the image recorder 1107 can be displayed on the display unit 1108. In recent years, displays have been equipped with touch operation technology, and enable the user to select and focus on an object on the display during live-view imaging. That is, the TS specifying unit 1109 is usually included in the display unit 1108.

A description will now be given of the control of the lens apparatus 001. A focus operation rotation detector 1002 includes a focus operation ring 019 and a sensor (not illustrated) that detects the rotation of the focus operation ring 019. An aperture operation rotation detector 1011 includes an aperture operation ring 020 and a sensor (not illustrated) that detects the rotation of the aperture operation ring 020. A zoom operation rotation detector 1003 includes a zoom operation ring 006 and a sensor (not illustrated) that detects the rotation of the zoom operation ring 006. A TS operation detector 1001 includes a manual operation unit (not illustrated) for obtaining tilt/shift effects and a sensor (not illustrated) that detects an operation amount of the manual operation unit. An object memory 1012 stores a spatial position in the imaging range of an object specified via the TS specifying unit 1109 or the display unit 1108. This position is defined by an object distance and the coordinates (X, Y) on the XY-axes plane of the imaging plane, but details thereof will be omitted.

An image stabilization (IS) driving unit 1004 includes an actuator for driving an image stabilizing lens (not illustrated) that performs image stabilizing operation and its driving circuit. This structure is unnecessary for a lens apparatus that has no image stabilizing function. An autofocus (AF) driving unit 1006 includes a second lens 022 that performs a focusing operation, and a focus unit (ultrasonic motor unit) 010 that moves the second lens 22 in the optical axis direction according to information on its driving amount. Information about the driving amount is determined based on a signal from the camera CPU 1100 described above. Alternatively, the focus operation rotation detector 1002 may be operated and the information about the driving amount may be determined from a signal of a manually instructed focus position.

An electromagnetic (EM) aperture driving unit 1005 controls its driving source by the lens CPU 1000 that has received an aperture driving command from the camera CPU 1100, and operates the aperture mechanism 011 to an opening state corresponding to the specified F-number. The electromagnetic aperture driving unit 1005 is similarly operated in a case where the user specifies a desired F-number by operating the aperture operation ring 020.

A TS driving unit 1007 is controlled by the lens CPU 1000 which has received an object distance, position information, and imaging range information from the camera CPU 1100. That is, the lens CPU 1000 controls the TS driving unit 1007 so as to perform the tilt operation for acquiring a desired object plane (focal plane) and perform the shift operation for acquiring a desired imaging range. To obtain the desired in-focus state, the lens CPU 1000 controls the TS driving unit 1007 and AF driving unit 1006 so that they optimally operate. The lens apparatus 001 has such an optical characteristic that a focus state is changed by the shift operation even in a case where the object distance does not change. In this embodiment, the TS driving unit 1007 and AF driving unit 1006 are properly controlled according to their optical characteristics.

A gyro sensor (not illustrated) is disposed and fixed inside the lens apparatus 001 and electrically connected to the lens CPU 1000. The gyro sensor detects the respective angular velocities of vertical (pitch direction) shake and horizontal (yaw direction) shake, which are angular shakes of the camera system 000, and outputs the detected values to the lens CPU 1000 as angular velocity signals. The lens CPU 1000 electrically or mechanically integrates angular velocity signals in the pitch direction and the yaw direction from the gyro sensor, and calculates a displacement amount in each direction, namely, a shake amount in the pitch direction and a shake amount in the yaw direction (collectively referred to as an angular shake amount).

The lens CPU 1000 controls the IS driving unit 1004 based on a combined displacement amount of the above angular shake amount and a parallel shake amount to shift the image stabilizing lens (not illustrated) to perform angular shake correction and parallel shake correction. As described above, this structure and function are unnecessary in a case where the lens apparatus 001 has no image stabilizing function. The lens CPU 1000 controls the AF driving unit 1006 based on the focus shake amount to move the second lens 022 in the optical axis direction and to correct the focus shake.

In the lens apparatus 001, the lens CPU 1000 controls the TS driving unit 1007 based on the shake and displacement amounts of the lens apparatus 001 calculated based on the output from the gyro sensor. For example, in a case where camera shake occurs in the camera system 000 held by hand during imaging, the object plane shifts relative to the object. However, since the camera system 000 according to this embodiment stores the object position in the object memory 1012, the TS driving unit 1007 can be controlled that corrects camera shake and keeps the object plane aligned with the object. The details of this control will be described below. For the control of the TS driving unit 1007, a signal from the acceleration sensor (acceleration detector) mounted on the camera body 002 may be used. Alternatively, the lens apparatus 001 may include the acceleration sensor.

Figure 3A:
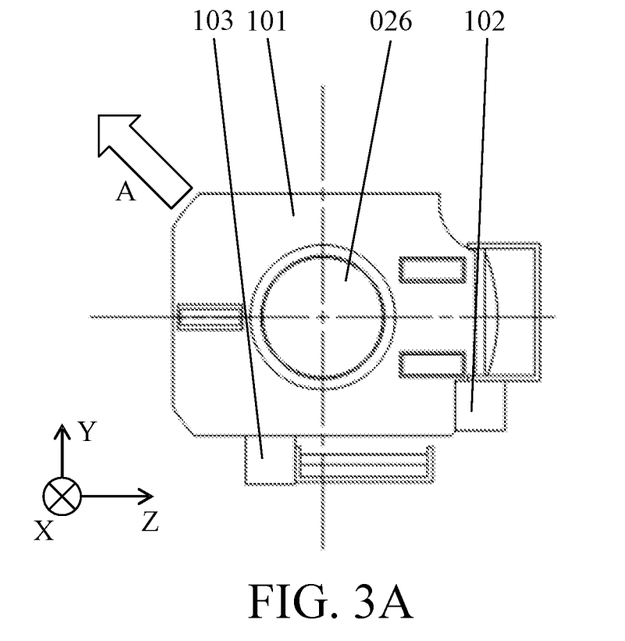
FIGS. 3A and 3B are front views of the principal part of the lens apparatus according to the first embodiment.
Figure 3B:
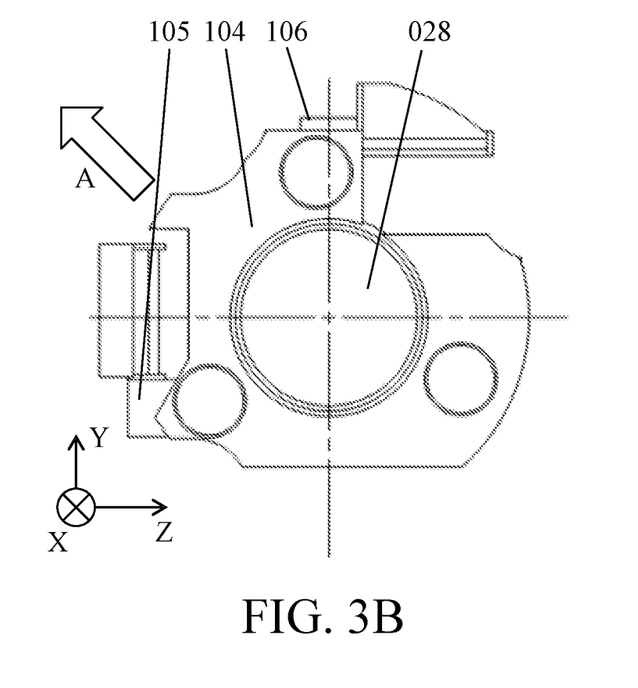

FIGS. 3A and 3B are front views of the principal part of the lens apparatus 001. FIG. 3A illustrates a front view of the sixth lens 026 and the driving unit for driving the sixth lens 026. FIG. 3B illustrates a front view of the eighth lens 028 and the driving unit for driving the eighth lens 028.

The sixth lens 026 is held by a sixth lens holding frame 101. The sixth lens 026 is supported by a support mechanism (not illustrated) so that the sixth lens 026 is movable in the Y-axis direction (first direction) by the stepping motor 102 and in the Z-axis direction (second direction) by the stepping motor 103. The eighth lens 028 is held by an eighth lens holding frame 104. The eighth lens 028 is supported by a support mechanism (not illustrated) so that the eighth lens 028 is movable in the Y-axis direction (first direction or fourth direction) by the stepping motor 105 and in the Z-axis direction (second direction or fifth direction) by the stepping motor 106.

In this manner, the stepping motors 102, 103, 105, and 106 constitute an actuator (driving unit) configured to drive the sixth lens 026 or the eighth lens 028 within the plane orthogonal to the optical axis 004. More specifically, the stepping motors 102 and 105 serve as a first (or third) driving unit (first or third actuator) configured to drive the sixth lens 026 or the eighth lens 028 in the first direction (or fourth direction) within the plane orthogonal to the optical axis 004. The stepping motors 103 and 106 serve as a second (or fourth) driving unit (or second or fourth actuator) configured to drive the sixth lens 026 or the eighth lens 028 in the second direction (or fifth direction) within the plane orthogonal to the optical axis 004.

Therefore, each of the sixth lens 026 and the eighth lens 028 is movable in an arbitrary direction within the plane orthogonal to the optical axis (YZ-axes plane). For example, in moving the sixth lens 026 and the eighth lens 028 in the arrow A direction (third direction) in FIGS. 3A and 3B, it is necessary to drive the four stepping motors 102, 103, 105, and 106 respectively. However, depending on the power (power capacity) supplied from the camera body 002, the four stepping motors 102, 103, 105, and 106 may not be driven simultaneously. For example, this is a case where the power suppliable to each stepping motor is less than the sum of the power required to drive the stepping motor 102 (or stepping motor 105) and the power required to drive the stepping motor 103 (or stepping motor 106). It may take a long time to reach the desired position. It is conceivable to reduce the electric power by lowering the resistance of the coil of each stepping motor, but the torque necessary to drive the lens may not be satisfied or the driving speed of the lens may be lowered. Although the increased size of the engine unit (magnetic circuit) of each stepping motor may handle this, the size of the lens apparatus may increase due to restrictions on the arrangement of components.

Accordingly, this embodiment limits the number of simultaneously driven stepping motors. That is, the lens CPU 1000 provides a period in which the stepping motors 102 and 103 (or the stepping motors 105 and 106) are not simultaneously driven in driving the sixth lens 026 or the eighth lens 028 in the third direction different from the first and second directions. The lens CPU 1000 may control each stepping motor to drive the sixth lens 026 or the eighth lens 028 without simultaneously driving the stepping motors 102 and 103 (or the stepping motors 105 and 106). The lens CPU 1000 may control each stepping motor so as not to drive all the stepping motors 102, 103, 105, and 106 at the same time (so as to limit the number of simultaneously driven stepping motors to three or fewer).

This configuration can reduce the time to move the sixth lens 026 and the eighth lens 028 to their respective desired positions while the power consumption of the stepping motors is reduced. For example, the stepping motors 102 and 103 are not driven at the same time, and the number of stepping motors to be driven at the same time is limited to three or fewer. In this embodiment, in a case where the sixth lens 026 and the eighth lens 028 are moved in the same direction at the same speed by the same amount, the electric power for moving the sixth lens 026 is larger. Power consumption can be suppressed by not simultaneously driving the stepping motors 102 and 103 for the sixth lens 026, which require larger power for driving the lens. However, this embodiment is not limited to this example, and may control the stepping motors 105 and 106 for the eighth lens 028 so that the stepping motors 105 and 106 are not driven at the same time.

The torque required for the stepping motors 102 and 103 to move the sixth lens 026 changes according to the orientation of the lens apparatus 001. Assume that the gravity direction is the −Y-axis direction. Then, the stepping motor 102 among the stepping motors 102 and 103 requires a larger torque to move the sixth lens 026. In a case where the stepping motors 102 and 103 have the same specifications, driving the stepping motor 102 consumes more power for moving the sixth lens 026. Similarly, in a case where the stepping motors 105 and 106 have the same specifications, driving the stepping motor 105 consumes more power for moving the eighth lens 028. Under these conditions, properly controlling each stepping motor can reduce the time to move the sixth lens 026 and the eighth lens 028 to their respective desired positions with less power consumption.

For example, assume that the gravity direction during imaging is the −Y-axis direction. Then, the stepping motors 102 and 105 that move the lenses against gravity are not driven at the same time, but the stepping motors 102 and 106 are driven at the same time. Thereafter, the stepping motors 103 and 105 are driven at the same time. This control can suppress the time to move the sixth lens 026 and the eighth lens 028 to their respective desired positions with less power consumption. In this embodiment, the acceleration sensor mounted on the camera body 002 can detect the gravity direction. This embodiment can change the control of each stepping motor according to the gravity direction.

In this embodiment, the lens moving direction by the stepping motors 102 and 105 and the lens moving direction by the stepping motors 103 and 106 are the same directions, but this embodiment is not limited to this example. For example, the lens moving direction by the stepping motor 105 may be the arrow A direction in FIGS. 3A and 3B, and the lens moving direction by the stepping motor 106 may be a direction orthogonal to the arrow A direction in FIGS. 3A and 3B.

Second Embodiment

Figure 4A:
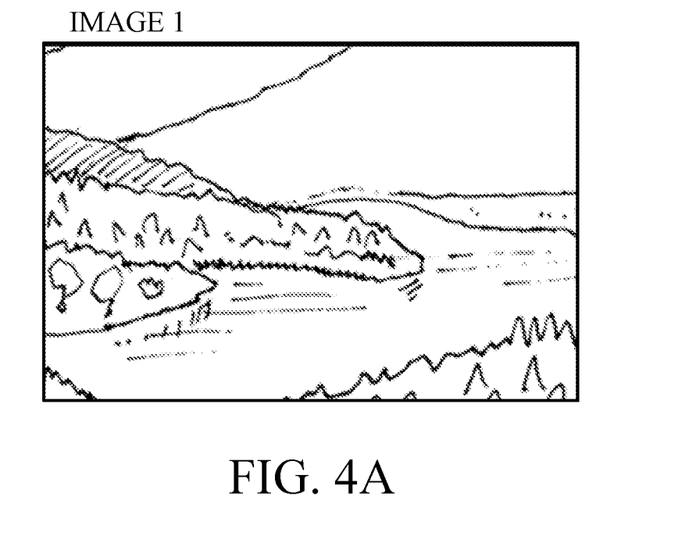
FIGS. 4A and 4B are images captured by an image pickup apparatus in a second embodiment.
Figure 4B:
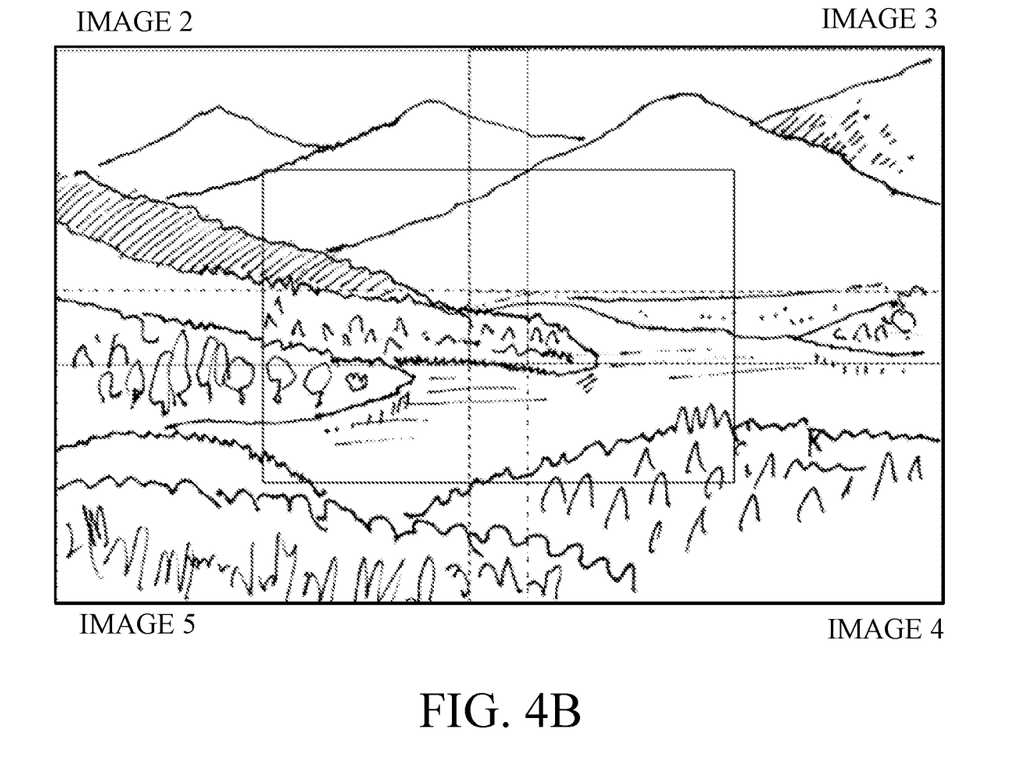

Referring now to FIGS. 4A and 4B, a description will be given of a camera system (image pickup apparatus) 000 according to a second embodiment of the present disclosure. FIGS. 4A and 4B are images captured by the camera system 000. FIG. 4A illustrates an image obtained by normal imaging (image 1). FIG. 4B illustrates a combined image of a plurality of images (images 2, 3, 4, and 5) captured by moving the sixth lens 026 and the eighth lens 028 in arbitrary directions within a plane orthogonal to the optical axis 004 after the normal imaging. Image 1 illustrated in FIG. 4A is the same image as the image indicated by a solid line in the central area of the combined image illustrated in FIG. 4B. As illustrated in FIG. 4B, an angle of view is widened by combining the plurality of images (images 2 to 5).

A description will be given of a method of capturing the combined image. The camera body 002 has a mode (combined imaging mode) for combining a plurality of images captured by moving the sixth lens 026 and the eighth lens 028 in arbitrary directions within the plane orthogonal to the optical axis 004. The combined imaging mode includes a plurality of modes according to the moving amounts and moving directions of the sixth lens 026 and the eighth lens 028. The user can select any mode from the plurality of modes. The user can arbitrarily set the details of each mode, and the camera body 002 can record the plurality of modes. Setting the mode, for example, can easily capture images at a plurality of angles of view without using a zoom optical system.

In the combined imaging mode, after image 1 is captured, images 2, 3, 4, and 5 are automatically captured in this order. In the combined imaging mode, the camera body 002 may be fixed on a tripod or the like during imaging. The camera body 002 includes an image processor for recording a plurality of images obtained by the image sensor on a recording medium in the image recorder 1107 and for obtaining an image obtained by combining the plurality of images recorded on the recording medium. Thereby, a combined image can be generated.

A description will now be given of a method for driving each stepping motor in the combined imaging mode. In order to capture image 2 after image 1 is captured, the sixth lens 026 and the eighth lens 028 are moved in the upper left direction on the paper plane. As described above, due to restrictions on the power supplied from the camera body 002, the four stepping motors cannot be simultaneously driven, or it may take a long time to reach the desired position. Accordingly, this embodiment does not simultaneously drive the stepping motors 102 and 105, and limits the number of simultaneously driven stepping motors to three or fewer.

For example, the stepping motors 102 and 106 are simultaneously driven to move the sixth lens 026 upward on the paper plane and the eighth lens 028 leftward on the paper plane. Thereafter, the stepping motors 103 and 105 are simultaneously driven to move the sixth lens 026 leftward on the paper plane and the eighth lens 028 upward on the paper plane. Thereby, the sixth lens 026 and the eighth lens 028 are moved to positions where image 2 can be captured, and image 2 can be captured. After image 2 is captured, the sixth lens 026 and the eighth lens 028 are moved rightward on the paper plane, and image 3 is captured. At this time, two stepping motors 103 and 106 are simultaneously driven and the load applied to the stepping motors in capturing image 2 is smaller. Thus, the stepping motors 103 and 106 can be driven simultaneously. Similarly, after image 3 is captured, the sixth lens 026 and the eighth lens 028 are moved downward on the paper plane, and image 4 is captured. After image 4 is captured, the sixth lens 026 and the eighth lens 028 are moved leftward on the paper plane, and image 5 is captured.

In either case, two stepping motors can be simultaneously driven because the load applied to the stepping motors in capturing image 2 is smaller. As described above, properly controlling each stepping motor can reduce the time to move the sixth lens 026 and the eighth lens 028 to their respective desired positions with less power consumption.

This embodiment performs imaging from image 1, which is located at the center of the combined image, but this embodiment does not limit the positions and order of objects. For example, image 5 may be captured and then images 4, 3, 2, and 1 may be captured in this order. Five images are combined, but the number of images to be combined is not limited to five. This embodiment does not simultaneously drive the stepping motors 102 and 103 in the combined imaging mode. However, in a case where the manual operation is made by the manual operation unit provided in the lens apparatus 001, the stepping motors 102 and 103 may be controlled so that they are simultaneously driven.

One known lens movable in the direction orthogonal to the optical axis is an image stabilizing lens movable in arbitrary directions within the plane orthogonal to the optical axis using two driving units in order to correct image blur caused by camera shake. However, the image stabilizing lens corrects image blur caused by camera shake, etc., and the method according to each embodiment for driving only one of the two driving units cannot be applied to the image stabilizing lens.

In each embodiment, the lens CPU 1000 may include a first mode (mode for simultaneously driving a plurality of actuators) and a second mode (low power consumption mode), which can be selected by the user. In a case where the first mode is set, the lens CPU 1000 simultaneously drives the stepping motors 102 and 103 (or the stepping motors 105 and 106), thereby contributing to user convenience such as speed improvement. On the other hand, in a case where the second mode is set, the lens CPU 1000 can reduce power consumption without simultaneously driving the stepping motors 102 and 103 (or the stepping motors 105 and 106).

Each embodiment can provide a lens apparatus and an image pickup apparatus, each of which can drive a shift lens with low power consumption.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-112498, filed on Jul. 13, 2022, which is hereby incorporated by reference herein in its entirety.

What is claimed is:

1. A lens apparatus comprising:
a shift lens movable in a direction orthogonal to an optical axis of an imaging optical system;
an actuator configured to drive the shift lens in a plane orthogonal to the optical axis;
a memory storing instructions; and
a processor configured to execute the instructions to control the actuator,
wherein the actuator includes:
a first actuator configured to drive the shift lens in a first direction within the plane; and
a second actuator configured to drive the shift lens in a second direction within the plane, and
wherein in driving the shift lens in a third direction different from the first direction and the second direction, the processor controls the actuator so that:
in a first mode, the first actuator and the second actuator are driven simultaneously; and
in a second mode, the first actuator and the second actuator are not simultaneously driven.

2. The lens apparatus according to claim 1, wherein power suppliable to the first actuator and the second actuator is less than a sum of power required to drive the first actuator and power required to drive the second actuator.

3. The lens apparatus according to claim 1, wherein:
the shift lens includes a first shift lens and a second shift lens,
each of the first actuator and the second actuator drives the first shift lens,
the actuator further includes:
a third actuator configured to drive the second shift lens in a fourth direction within the plane; and
a fourth actuator configured to drive the second shift lens in a fifth direction within the plane, and
the processor controls the actuator so that all of the first actuator, the second actuator, the third actuator, and the fourth actuator are not simultaneously driven.

4. An image pickup apparatus comprising:
a lens apparatus according to claim 1,
a camera body that includes an image sensor.

5. The image pickup apparatus according to claim 4, wherein the camera body includes:
a mode for combining a plurality of images obtained by shifting the shift lens;
a recording medium configured to record the plurality of images obtained by the image sensor for each shift of the shift lens; and
an image processor configured to generate a combined image of the plurality of images.

6. The image pickup apparatus according to claim 5, wherein the camera body has a plurality of modes for generating the combined image according to a moving distance of the shift lens.

7. The image pickup apparatus according to claim 6, wherein the recording medium records a first image among the plurality of images, and then automatically records second and subsequent images according to the plurality of modes.

8. The image pickup apparatus according to claim 4, further comprising an acceleration detector.

9. The image pickup apparatus according to claim 4, wherein the lens apparatus is attachable to and detachable from the camera body.

10. A lens apparatus comprising:
a shift lens including a first shift lens and a second shift lens that generate a tilt effect and a shift effect by moving in a direction orthogonal to an optical axis of an imaging optical system;
an actuator configured to drive the first shift lens or the second shift lens in a plane orthogonal to the optical axis;
a memory storing instructions; and
a processor configured to execute the instructions to control the actuator,
wherein the actuator includes:
a first actuator configured to drive the first shift lens or the second shift lens in a first direction within the plane; and
a second actuator configured to drive the first shift lens or the second shift lens in a second direction within the plane, and
wherein in driving the first shift lens or the second shift lens in a third direction different from the first direction and the second direction, the processor controls the actuator so that:
in a first mode, the first actuator and the second actuator are driven simultaneously; and
in a second mode, the first actuator and the second actuator are not simultaneously driven.

11. The lens apparatus according to claim 10, wherein power suppliable to the first actuator and the second actuator is less than a sum of power required to drive the first actuator and power required to drive the second actuator.

12. An image pickup apparatus comprising:
the lens apparatus according to claim 10; and
a camera body that includes an image sensor.

13. The image pickup apparatus according to claim 12, wherein the camera body includes:

a mode for combining a plurality of images obtained by shifting the shift lens;

a recording medium configured to record the plurality of images obtained by the image sensor for each shift of the shift lens; and an image processor configured to generate a combined image of the plurality of images.

14. The image pickup apparatus according to claim 13, wherein the camera body has a plurality of modes for generating the combined image according to a moving distance of the shift lens.

15. The image pickup apparatus according to claim 14, wherein the recording medium records a first image among the plurality of images, and then automatically records second and subsequent images according to the plurality of modes.

16. The image pickup apparatus according to claim 12, further comprising an acceleration detector.

17. The image pickup apparatus according to claim 12, wherein the lens apparatus is attachable to and detachable from the camera body.

* * * * *